United States Patent Office,

JULIUS SCHUNCKE, OF LUDWIGSHAFEN-ON-THE-RHINE, BAVARIA, ASSIGNOR TO BADISCHE ANILIN & SODA FABRIK, OF MANNHEIM, GERMANY.

AZO COLOR.

SPECIFICATION forming part of Letters Patent No. 246,221, dated August 23, 1881.

Application filed July 9, 1881. (Specimens.)

*To all whom it may concern:*

Be it known that I, JULIUS SCHUNCKE, a subject of the King of Würtemberg, residing at Ludwigshafen-on-the-Rhine, in the Kingdom of Bavaria and Empire of Germany, have invented new and useful Improvements in Dye-Stuffs or Coloring-Matters, of which the following is a specification.

This invention relates to the production of a garnet coloring-matter or dye-stuff suitable for dyeing and printing, which is capable of replacing archil in some of its industrial applications, and which may be termed "archil-red."

This coloring-matter belongs to the class of the azo compounds, and results from the action of the diazo compound of amidoazo-xylole upon an alkaline solution of a bisulpho-acid of beta-naphthol.

In preparing the archil-red I mix ten parts of amidoazo-xylole with thirty parts of muriatic acid of a specific gravity of 1.16—1.17, and with twenty parts of water, and then I gradually add, constantly stirring, a solution of two and one-half parts of nitrite of sodium in fifty parts of water, and keep the mixture cold by the addition of ice. After standing one hour a dark-brown solution of the diazo compound of amidoazo-xylole results, which I mix, constantly stirring and cooling, with an alkaline solution of beta-naphthol bisulpho-acid and five parts of caustic soda in two hundred parts of water. Care is to be taken to maintain the mixture during the whole operation always alkaline. After mixing the said solution of beta-naphthol bisulpho-acid, the dye-stuff or coloring-matter is precipitated in the form of a brownish paste, which is filtered, pressed, and purified by dissolving it in hot water. From this solution it is precipitated with common salt. After drying the archil-red is in the form of a black powder with a green metallic luster. This powder is a sodium compound of the coloring-matter and soluble in water, and is suitable for dyeing according to the methods in use for the azo dyes. It dyes wool, silk, and cotton with garnet shades similar to archil. It dyes only in an acidulated bath, and does not turn red in an acid-bath. Archil dyes purple in an alkaline-bath, and the color is changed into a certain red in an acid-bath.

What I claim as new, and desire to secure by Letters Patent, is—

As a new article of manufacture, the garnet coloring-matter which I term "archil-red," produced by the action of the diazo compound of amidoazo-xylole upon an alkaline solution of beta-naphthol bisulpho-acid, substantially as described, or by any other means which will produce a like result.

In testimony whereof I have hereunto set my hand in the presence of two subscribing witnesses.

JULIUS SCHUNCKE.

Witnesses:
C. GLASER,
A. HANSER.